United States Patent
Gaisford

(10) Patent No.: US 8,407,362 B2
(45) Date of Patent: Mar. 26, 2013

(54) AUTO-DISCOVERY BASED ITEM(S) SHARING, INCLUDING SENDER PUSHING AND RECIPIENT APPROVAL

(75) Inventor: Calvin R. Gaisford, Orem, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1230 days.

(21) Appl. No.: 12/057,440

(22) Filed: Mar. 28, 2008

(65) Prior Publication Data

US 2009/0248832 A1 Oct. 1, 2009

(51) Int. Cl.
G06F 21/00 (2006.01)
(52) U.S. Cl. .......... 709/232; 715/200; 715/741
(58) Field of Classification Search ........ 726/3, 27; 705/58, 76; 709/201–203, 223, 225, 227
See application file for complete search history.

(56) References Cited

U.S. PATENT DOCUMENTS

| | | | | |
|---|---|---|---|---|
| 7,117,370 | B2 * | 10/2006 | Khan et al. | 713/186 |
| 7,506,369 | B2 * | 3/2009 | Buch et al. | 726/12 |
| 7,516,182 | B2 * | 4/2009 | Goldman | 709/206 |
| RE40,992 | E * | 11/2009 | Cartmell et al. | 726/6 |
| 7,730,223 | B1 * | 6/2010 | Bavor et al. | 710/8 |
| 7,783,800 | B2 * | 8/2010 | Staats et al. | 710/64 |
| 7,904,964 | B1 * | 3/2011 | Risan et al. | 726/27 |
| 2003/0212829 | A1 * | 11/2003 | Schofield et al. | 709/250 |
| 2009/0057427 | A1 * | 3/2009 | Geadelmann et al. | 236/51 |
| 2009/0158273 | A1 * | 6/2009 | Paul et al. | 717/178 |
| 2009/0182813 | A1 * | 7/2009 | McCartie et al. | 709/205 |
| 2010/0241711 | A1 * | 9/2010 | Ansari et al. | 709/205 |

OTHER PUBLICATIONS

"File Sharing"; Mar. 5, 2008; Wikipedia, the free encyclopedia; http://en.wikipedia.org/wiki/File_sharing, 5 pages.
"Giver—Easy File Sharing"; Feb. 22, 2008; SUSE Idea Pool; http://idea.opensus.org/content/ideas/easy-file-sharing, 1 page.
"Sharing"; GNOME Subversion source code repository; 2004-2007, The GNOME Project; http://svn.gnome.org/viewvc/tomboy/branches/tomboy-sharing/Tom . . . , 2 pages.
"Welcome to Avahi!"; Feb. 22, 2008; http://avahi.org/, 1 page.

(Continued)

Primary Examiner — Kambiz Zand
Assistant Examiner — Leynna Truvan
(74) Attorney, Agent, or Firm — Osha Liang LLP

(57) ABSTRACT

Methods and apparatus involve the voluntary transfer or sharing of item(s), such as files or other data, based upon the automatic discovery of recipients, including sender pushing of the items and recipient approval. During use, computing devices advertise their availability for potential receipt of the items and recipients are automatically discovered. The sender attaches the items to a selected recipient, and a size, description, etc. of the items is calculated. Upon a connection between the sending and recipient computing devices, the sending device pushes to the recipient an identifier of the sender and the size, description, etc., so the recipient can determine whether they want to accept transfer. If so, the items are transferred, including display of the progress. If not, the sender is notified of the refusal. Other features contemplate attaching techniques, visual information display, authentication of parties, computer program products, and systems, to name a few.

10 Claims, 7 Drawing Sheets

OTHER PUBLICATIONS

"Welcome to the Telekinesis project"; Feb. 22, 2008; http://techn.ocracy.org/telekinesis/, 2 pages.

"openSUSE 10.3"; Feb. 22, 2008; http://www.novell.com/products/linuxpackages/opensuse/giver.html, 1 page.

Stuart Cheshire et al.; "Multicast DNS"; Aug. 10, 2006; Apple Computer, Inc.; http://files.multicastdns.org/draft-cheshire-dnsext-multicastdns.txt, 47 pages.

"Zeroconf"; Feb. 21, 2008; Wikipedia, the free encyclopedia; http://en.wikipedia.org/wiki/MDNS, 6 pages.

"Giver"; Feb. 22, 2008, Google, Google Code; http://code.google.com/p/giver/, 1 page.

"Multicast DNS"; Feb. 22, 2008, http://www.multicastdns.org/, 2 pages.

* cited by examiner

US 8,407,362 B2

AUTO-DISCOVERY BASED ITEM(S) SHARING, INCLUDING SENDER PUSHING AND RECIPIENT APPROVAL

FIELD OF THE INVENTION

Generally, the present invention relates to computing environments involving voluntary transfer of item(s), such as file or data sharing between computing devices. Particularly, although not exclusively, it relates to sharing item(s) based upon the automatic discovery of recipients, including sender pushing of the items to the recipient after recipient approval. Other features contemplate discovery techniques, techniques for attaching items to a recipient, file or data particulars, visual displaying of information, such as potential recipients and their information, transfer progress and refusal-to-accept notices, and authentication of parties, to name a few. Computer program products, computing interaction and systems are also disclosed.

BACKGROUND OF THE INVENTION

As is known, many ways exist to share or send files to people in a computing environment. But in every technology, it is required to know a modicum of information about the recipient, such as an email address, a login id, etc., before transmission of files can occur. That information causes inconvenience to senders because they have to first find it before they are able to use it. Also, traditional file sharing is of the type where recipients make requests of senders before file transfer occurs. Further, senders and recipients often lack actual knowledge of the other party involved in the transaction so security of information can be sometimes compromised.

Accordingly, there exists a need in the art of file or data transfer between parties to discover information about the recipient without having forehand knowledge of their email address, login id, etc. Also, there is a further need to be able to conveniently display recipient information to senders and to transfer items without requests first conning from the recipients. Authentication of parties is her useful. In that many computing configurations already have available discovery information about network users, it is further desirable to leverage existing configurations, thereby avoiding the costs of providing wholly new products. Taking advantage of existing frameworks, such as MDNS (multicast DNS), Avahi, Bonjour, etc. or any discovery framework is another feature that optimizes existing resources. Any improvements along such lines should further contemplate good engineering practices, such as relative inexpensiveness, stability, ease of implementation, high security, flexibility, etc.

SUMMARY OF THE INVENTION

The foregoing and other problems become solved by applying the principles and teachings associated with the hereinafter-described auto-discovery based item(s) transfer, including sender pushing and recipient approval. At a high level, methods and apparatus teach the voluntary transfer or sharing of item(s), such as files or other data (jpegs, video, photos, music, mp3s, cuts from application documents, etc.), based upon the automatic discovery of recipients, including a sending computing device pushing the items to the recipient upon approval by the recipient. In this manner, file or data transfer occurs as persons would exchange information with one another in person. No longer is file zipping or other bundling techniques required nor are recipients required to affirmatively request files or data to be furnished before receipt.

For example, two people use computers on a network. One person wants to give a file or data stored on their computer to the other person. The invention provides a means of discovering the other person on the network and giving the file or data to them without request of the recipient or the use of a third computer. In a representative embodiment, features combine the mDNS (multicast DNS) protocol for discovery along with push technology to send files and data, which results in advantage over the art. Namely, no pre-configuration is required to identify people and identification is based on a person's actual attributes, not their computer logins or ids, etc. Also, in that all prior solutions are request-based, no pushing technology for item transfer is used.

During use, computing devices advertise their availability for potential receipt of the items. Upon a sender desiring to transfer items, recipients are automatically discovered. The sender attaches the items to a selected recipient, and a size, description, etc. of the items is calculated. Upon a connection between the sending and recipient computing devices, the recipient is notified of a sender of the items and the size, description, etc., so they can determine whether they want to accept transfer of the items. If so, the items are transferred, including display of the progress of the transferring. If not, the sender is notified of the user's refusal to accept the items.

In specific embodiments, various displaying of the potential recipients for file or data transfer is disclosed. For instance, pictures, email addresses, names, titles, etc. are populated in a window for a sender to view. Dragging-and-dropping, cutting-and-pasting, or other data movement techniques are employed to attach the item(s) to one or more recipients. To be certain of sender or recipient authority for sensitive files or data, for instance, authentication optionally occurs per the various parties before transferring items.

In a computing system embodiment, the invention may be practiced with: a sending and recipient computing device arranged as part of pluralities of physical or virtual computing devices, including executable instructions for undertaking the foregoing auto-discovery, sender-pushing and recipient-approving methodologies. Computer program products are also disclosed and are available as a download or on a computer readable medium. The computer program products are also available for installation on a network appliance or individual computing devices. In still other embodiments, computing networks and party interaction are discussed, as are possible auto-discovery techniques.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for auto-discovery based item(s) transfer or sharing, including sender pushing of the items and recipient approval, are hereinafter described.

Figure 1:
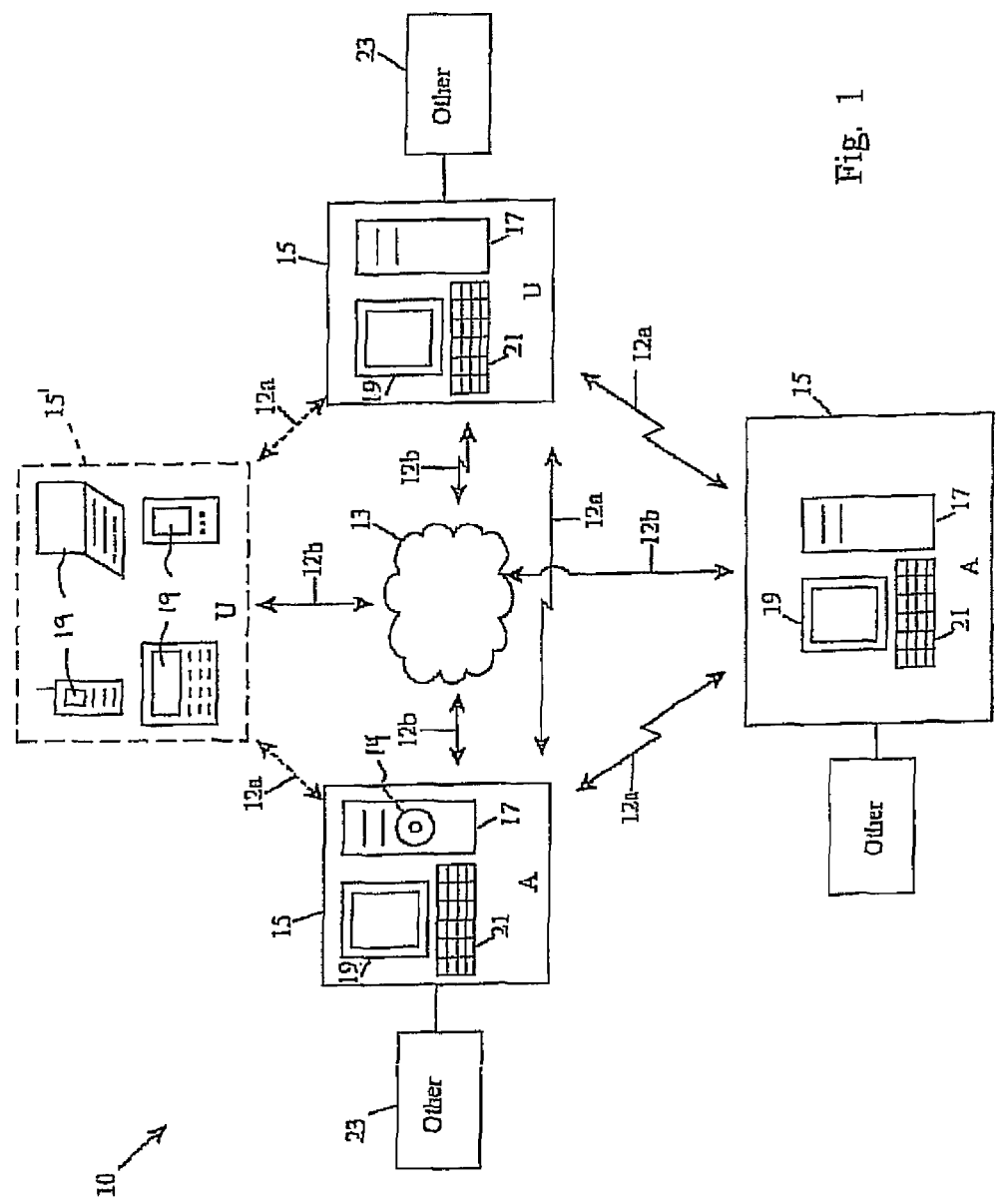
FIG. 1 is a diagrammatic view in accordance with the present invention of a representative computing environment for auto-discovery based item(s) transfer, including sender pushing and recipient approval.

With reference to FIG. 1, a representative computing environment 10 for practicing certain or all aspects of the invention includes one or more computing devices 15 or 15' arranged as individual or networked physical or virtual machines for senders and/or recipients of item(s), including clients or hosts arranged with a variety of other networks and computing devices. In a traditional sense, an exemplary computing device typifies a server 17, such as a grid or blade server. Brand examples include, but are not limited to, a Windows brand Server, a SUSE Linux Enterprise Server, a Red Hat Advanced Server, a Solaris server or an AIX server. Alternatively, it includes a general or special purpose computing device in the form of a conventional fixed or mobile (e.g., laptop) computer 17 having an attendant monitor 19 and user interface 21. The computer internally includes a processing unit for a resident operating system, such as DOS, WINDOWS, MACINTOSH, LEOPARD, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer computing device, a broadcast antenna, a web server, an AJAX client, a grid-computing node, a virtual machine, a web service endpoint, a cellular phone, or the like. The other items may also be stand alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available for installation as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download of executable instructions resident with a downstream computing device, or readable media, received from an upstream computing device or readable media, a download of executable instructions resident on an upstream computing device, or readable media, awaiting transfer to a downstream computing device or readable media, or any available media, such as RAM, ROM, EEPROM, CD-ROM, DVD, or other optical disk storage devices, magnetic disk storage devices, floppy disks, or any other physical medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T# lines, satellites, microwave relays or the like. The connections may also be local area networks (LAN), metro area networks (MAN), and/or wide area networks (WAN) that are presented by way of example and not limitation. The topology is also any of a variety, such as ring, star, bridged, cascaded, meshed, or other known or hereinafter invented arrangement.

Figure 2:
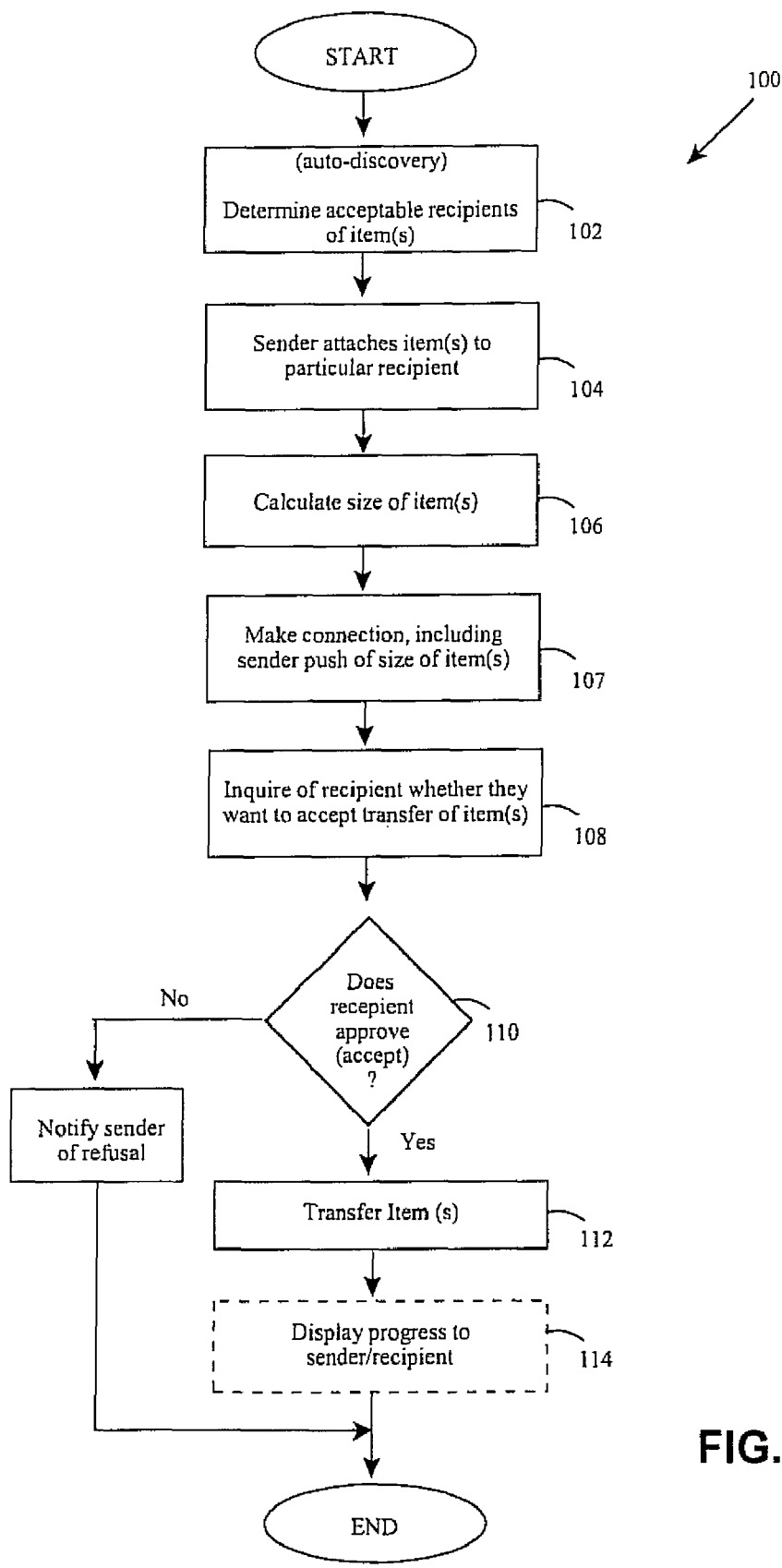
FIG. 2 is a flow chart in accordance with the present invention for practicing one or more features of the invention.

With the foregoing representative computing environment as backdrop, FIG. 2 teaches a high-level organization 100 for features of the invention. FIGS. 3-7 show representative views therefore displayed on a monitor 19 of a computing device (e.g., 15 or 15', FIG. 1). Beforehand, however, an application is installed on a computing device and run on a desktop, for instance. That application (presently configured as "Giver" in Opensuse 10.3) dynamically (or statically if such an overriding configuration exists) allocates a port of the computing device to host a small http/https server. The application then uses an MDNS (Multicast DNS) library (e.g., Avahi on Linux, Bonjour on others) to advertise itself on the network along with identifying information about the current user. That information includes, for instance, the user's name 201, email address 202, and a photograph 203. In turn, the photograph may be located on the computing device of the user and retrievable via a connection on the advertised port, or may be hosted on the web and found using an advertised URL.

In any event, a second computing device (e.g., 15 or 15', FIG. 1), also running the application, discovers all other machines on the network running this application, step 102. By collecting this information, the application can then display a list 210 of people (i.e., one or more recipients) ready to accept files or data and conveniently visually display their information, e.g., name, email address, photograph, etc., in a window 211. At step 104, the sender then attaches to the intended recipient the relevant items they wish to transfer. In various embodiments, Giver is enabled such that items can be selected 220 and dragged-and-dropped with a pointer 225 onto the photographs 203 (or other identifying information) of the recipient(s). In other embodiments, cutting-and-pasting techniques are possible as well as any other known or hereafter invented data-movement technique. At step 106, concurrent with the attachment or some time thereafter, the Giver application then calculates a size of the items to be sent and makes a connection with the recipient on the recipient's advertised port, step 107. It may also calculate other information such as a description of the items or other useful information.

Figure 5:
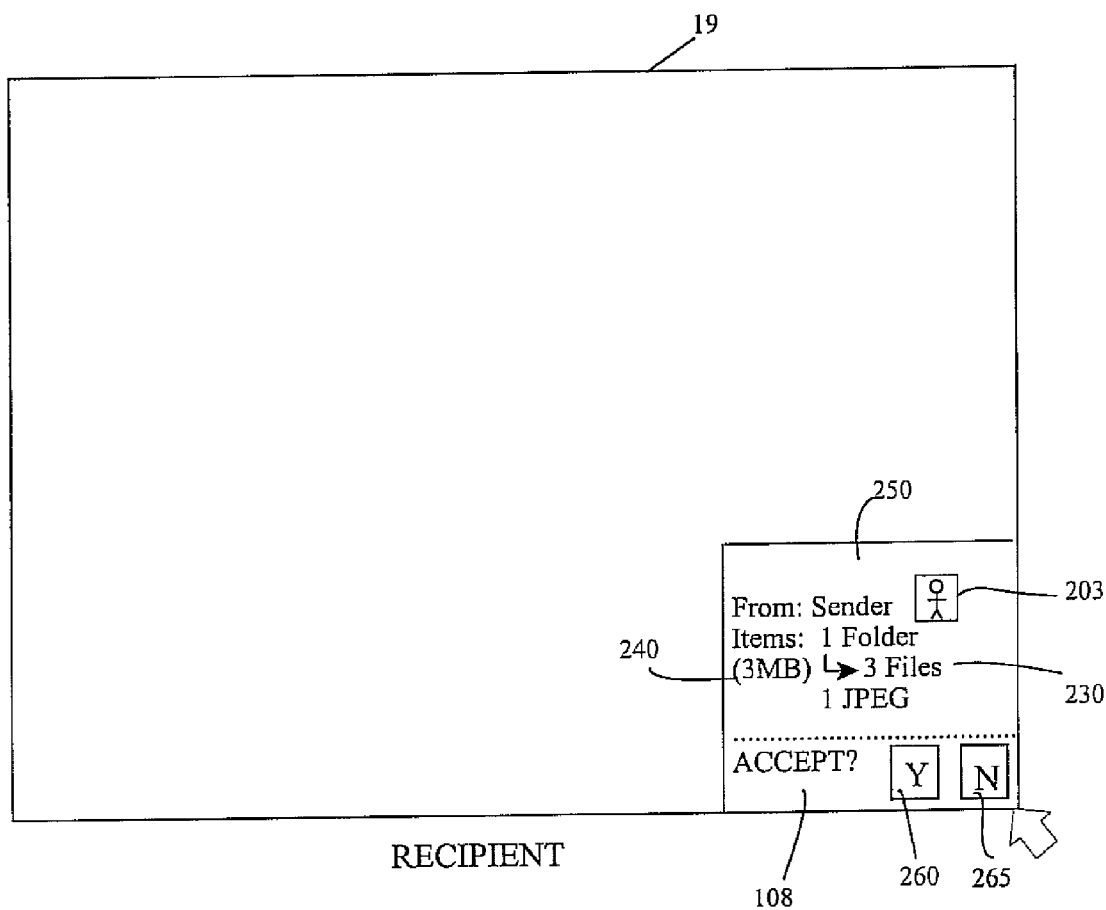
Figure 6:
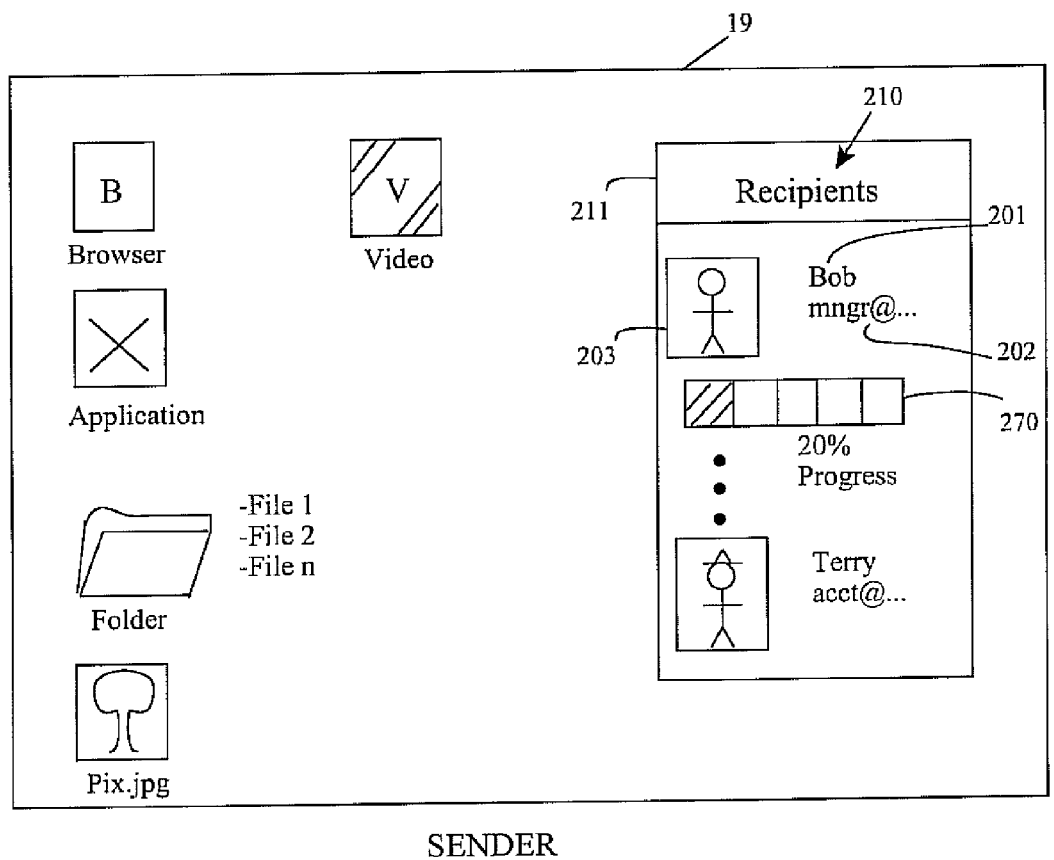
Figure 7:
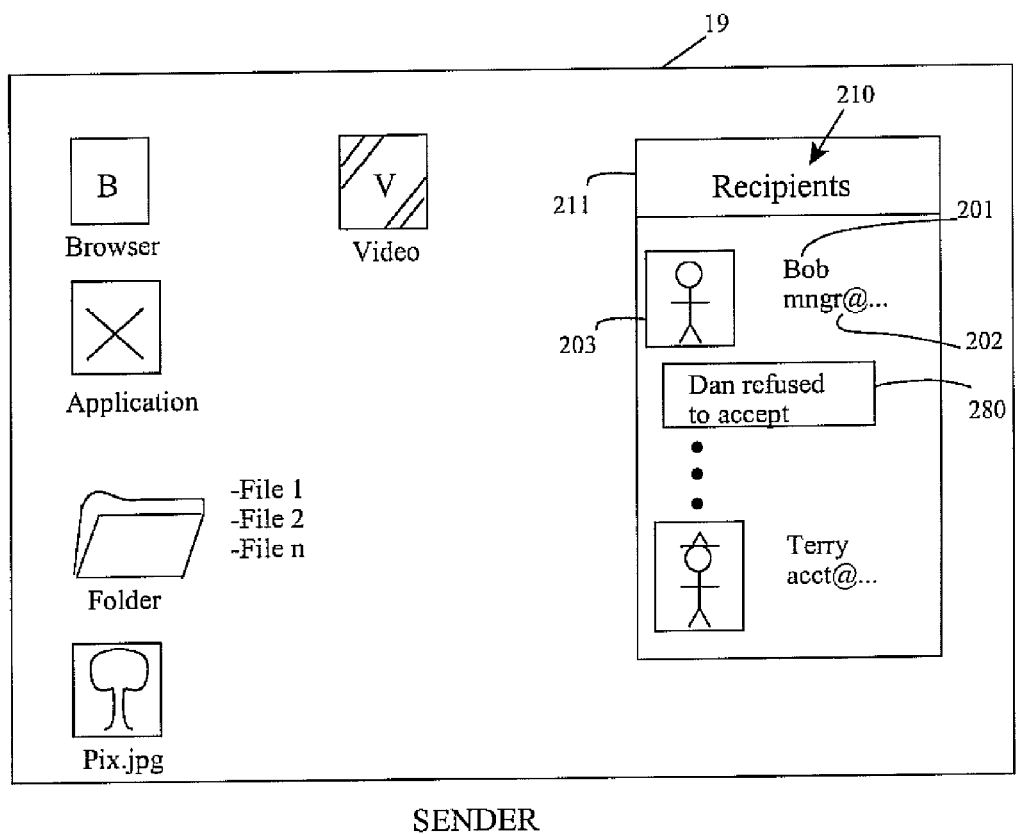

Further, the connection entails pushing a small amount of data to the recipient, such as the description and size of the to-be-transferred items so that the recipient can be meaningfully queried, at step 108, as to whether they want to accept the items. As seen in FIG. 5, the query 108 appears on the recipient's computing device as a box or window pop-up, including a description 230 and size 240 (e.g., 3 megabytes) of the items (so dragged-and-dropped from FIG. 4) and an identifier 250 about the sender so the recipient can make an informed decision as to whether they want to approve (accept) or reject the file or data transfer, step 110.

If so, the recipient indicates their desire to accept transfer, such as by clicking a Y answer box 260 with a pointing device, FIG. 5, and the item(s) are transferred, step 112. Optionally, step 114, this includes providing a display 270 of progress relative to the recipient's information in the display list 210 of the sender, FIG. 6 and/or a display of progress for the recipient. If not, on the other hand, the recipient indicates their refusal to accept transfer at step 110, such as by clicking a N answer box 265 with a pointing device, FIG. 5, and the sender is notified of same at 280, FIG. 7.

In sum, computing devices A and B, and others, are installed with a common program to advertise their availability for receipt of items and, when the sender of items discovers available recipients, they push the item(s) to the recipient(s) upon approval. Progress display is also possible as is notice of recipient refusal. As presently packaged, all of the communications between computing devices are done using a protocol written on top of http. However, the protocol could easily be moved and implemented over pure sockets, but for speed and ease of development, http was used as the base to build the first working protocol.

In alternate embodiments, a variety of extensions could exist. Also, it is possible to introduce a server that would perform an "online" check or approval and possibly caching of the moving of files. While there are many file sharing services, none are truly private that function like email. In this regard, skilled artisans can envision extensions as email but only for files and those written to deal with very large amounts of data, and sets of data (like folders of files).

An interface could also be added to the technology to allow other applications to plug in and share data between users (senders/recipients) of the items. For example, on Linux, F-Spot could plug into this technology and allow a user to see other users running F-Spot and have the option to share photos with them. The sharing would actually send the photos to the other computing devices and integrate them into the application. While some current solutions are similar to this, they are all pull technologies instead of push, and none have the intervening ability of approval by the recipients.

Figure 3:
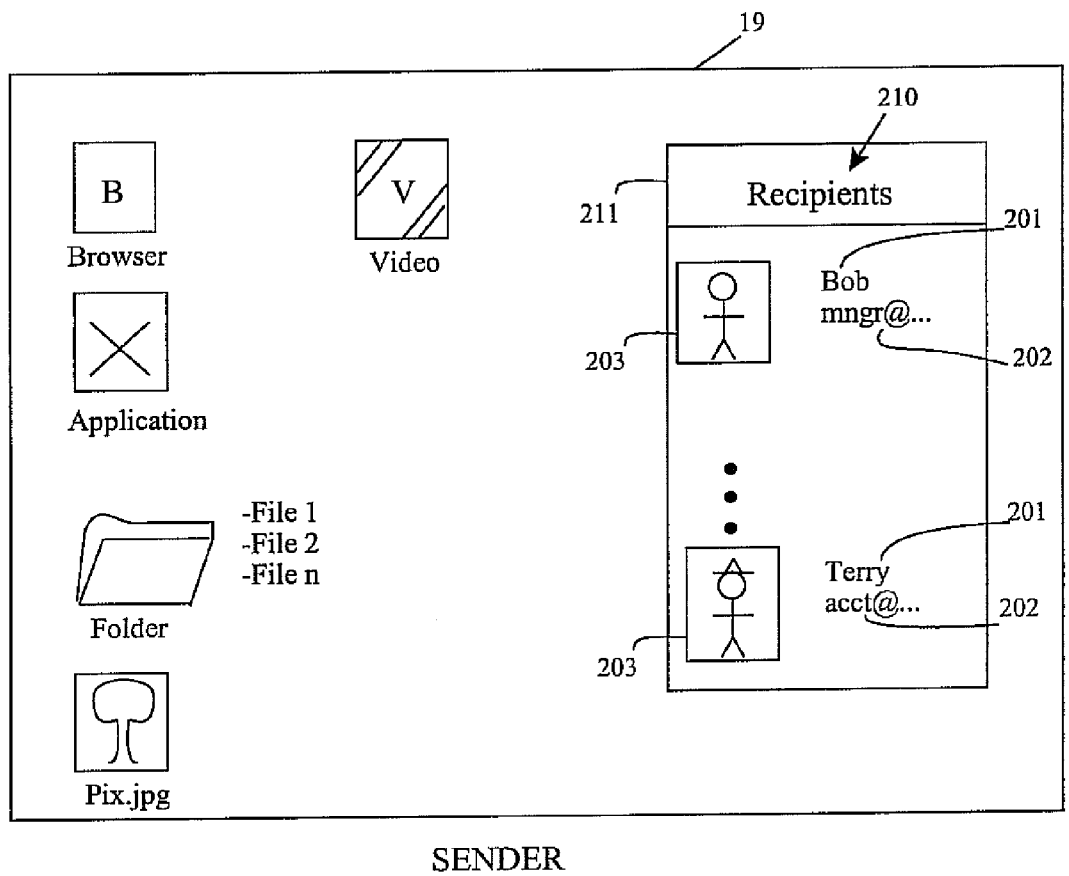
FIGS. 3-7 are diagrammatic views in accordance with the present invention corresponding to the representative flow chart of FIG. 2.
Figure 4:
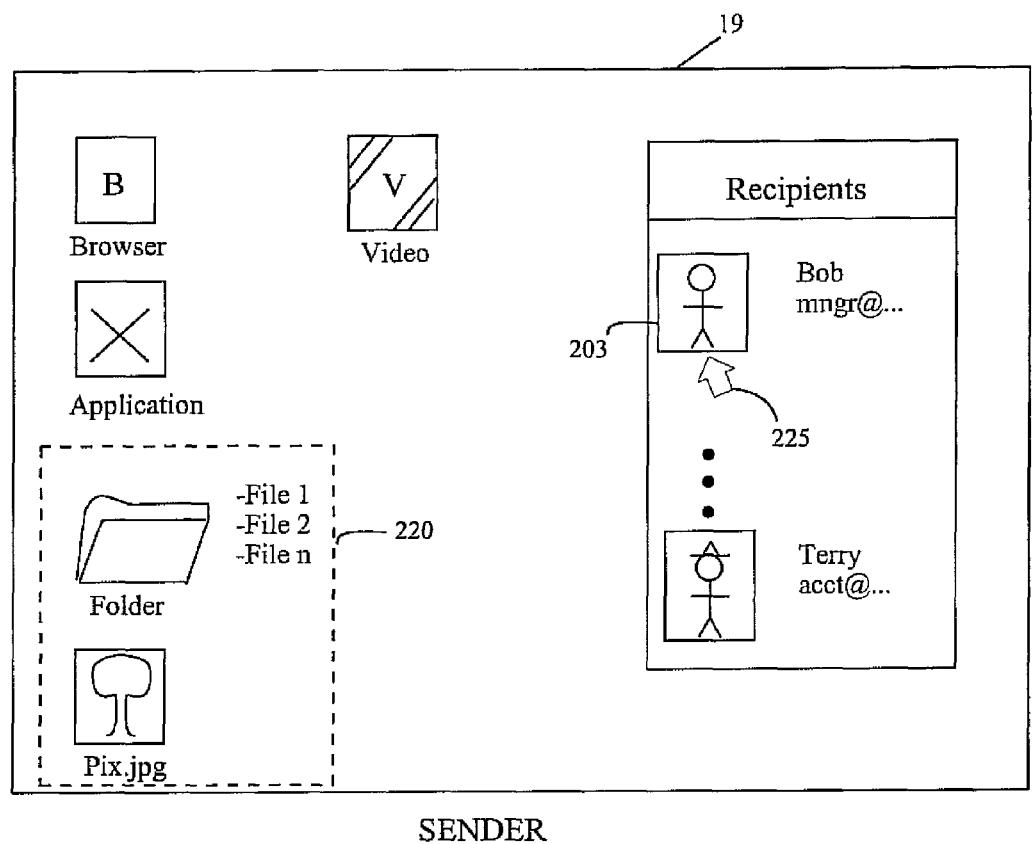

In still other embodiments, multicast sends could be introduced so that people together in a common conference room could have data broadcast from one sending computing device to all or many discovered recipients, e.g., all those on list 210, FIG. 3. And rather than making a connection to only one computer, the data is broadcast on a network and all computers that accepted or approved an initial send would be able to receive the item(s). Alternatively, each individual recipient could still approve or reject each future sending of item(s).

In any embodiment, skilled artisans will appreciate that item transfer could be used nefariously, such as for virus infection, spam, etc., or by users spoofing or pretending to be other users. Thus, a further embodiment of the invention contemplates authentication of one or more of the parties (sender/recipient(s)) involved in item transfer. Representatively, one party might request a public key to be transferred so they may be authenticated with a corresponding private key. In another, user authentication programs or third party authentication services may be launched as part of the process to authenticate either the sender or recipient(s), or both, and such would likely occur before any item(s) are actually transferred from one computing device to another. Authentication also can occur after the initial connection, but after the initial push of the item(s) size, such as at step 107. Of course, skilled artisans will readily contemplate other embodiments.

Finally, one of ordinary skill in the art will also recognize that additional embodiments are possible without departing from the teachings of the present invention. This detailed description, and particularly the specific details of the exemplary embodiments disclosed herein, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining tie various features of one or more figures with the features of one or more of other figures.

The invention claimed is:

1. A method of transferring items from a first computing device to a second computing device, comprising:
   by the first computing device, automatically discovering a plurality of computing devices on a network, wherein the network comprises the first computing device and the second computing device;
   at the first computing device, based on the discovery of the plurality of computing devices on the network, identifying a recipient for an item, wherein the recipient is currently using the second computing device;
   at the first computing device, associating the item to the recipient, wherein associating the item to the recipient indicates an intent to transfer the item to the recipient;
   after associating:
      at the first computing device, determining the size of the item and a description of the item;
      establishing a connection between the first and second computing devices;
      by the first computing device and without sending the item, sending the size of the item, the description of the item, and information about a sender of the item to the second computing device, wherein the sender of the item is the current user of the first computing device;
      at the first computing device, receiving an indication that the recipient wants to accept transfer of the item from the first computing device; and
      by the first computing device, sending the item to the second computing device in response to receiving the indication, wherein the item is not sent to the second computing device until after the indication is received.

2. The method of claim 1, further comprising:
   displaying, by the first computing device, a picture, an email address and a name of the recipient based on the discovery of the plurality of computing devices on the network.

3. The method of claim 2, wherein associating the item comprises dragging and dropping an image corresponding to the item onto at least one selected from a group consisting of the picture, the email address and the name of the recipient.

4. The method of claim 1, further comprising:
   receiving by the first computing device an indication from the recipient that the recipient is potentially available to receive the item.

5. The method of claim 1, wherein sending the item from the first computing device to the second computing device, comprises displaying progress of the transfer of the item.

6. A non-transitory computer readable medium comprising instructions which when executed by a processor perform a method for transferring items from a first computing device to a second computing device, the method comprising:
- automatically discovering a plurality of computing devices on a network, wherein the network comprises the first computing device and the second computing device;
- based on the discovery of the plurality of computing devices on the network, identifying a recipient for an item, wherein the recipient is currently using the second computing device;
- associating the item to the recipient, wherein associating the item to the recipient indicates an intent to transfer the item to the recipient;
- after associating:
  - determining the size of the item and a description of the item;
  - establishing a connection between the first and second computing devices;
  - without sending the item, sending the size of the item, the description of the item, and information about a sender of the item to the second computing device, wherein the sender of the item is the current user of the first computing device;
  - receiving an indication that the recipient wants to accept transfer of the item from the first computing device to the second computing device; and
  - sending the item to the second computing device in response to receiving the indication, wherein the item is not sent to the second computing device until after the indication is received.

7. The non-transitory computer readable medium of claim 6, wherein the method further comprises:
- displaying, on the first computing device, a picture, an email address and a name of the recipient based on the discovery of the plurality of computing devices on the network.

8. The non-transitory computer readable medium of claim 7, wherein associating the item comprises dragging and dropping an image corresponding to the item onto at least one selected from a group consisting of the picture, the email address and the name of the recipient.

9. The non-transitory computer readable medium of claim 6, wherein the method further comprises:
- receiving by the first computing device an indication from the recipient that the recipient is potentially available to receive the item.

10. The non-transitory computer readable medium of claim 6, wherein sending the item from the first computing device to the second computing device, comprises displaying progress of the transfer of the item on the first computing device.

* * * * *

UNITED STATES PATENT AND TRADEMARK OFFICE
CERTIFICATE OF CORRECTION

| | | |
|---|---|---|
| PATENT NO. | : 8,407,362 B2 | Page 1 of 1 |
| APPLICATION NO. | : 12/057440 | |
| DATED | : March 26, 2013 | |
| INVENTOR(S) | : Gaisford | |

It is certified that error appears in the above-identified patent and that said Letters Patent is hereby corrected as shown below:

On Title page, in column 2, under "Other Publications", line 4, delete "opensus" and insert -- opensuse --, therefor.

In the Specification:

In column 1, line 42, delete "her" and insert -- further --, therefor.

In column 1, line 47, delete "MDNS" and insert -- mDNS --, therefor.

In column 4, line 38, delete "MDNS" and insert -- mDNS --, therefor.

In column 6, line 20, delete "tie" and insert -- the --, therefor.

Signed and Sealed this
Ninth Day of July, 2013

Teresa Stanek Rea
*Acting Director of the United States Patent and Trademark Office*